United States Patent
Delafield

[11] 3,883,257
[45] May 13, 1975

[54] MOLDED JOINT COMPONENT FOR TUBULAR FRAME FURNITURE

[75] Inventor: Fredrick B. Delafield, Altavista, Va.

[73] Assignee: The Lane Company, Inc., Altavista, Va.

[22] Filed: Nov. 5, 1973

[21] Appl. No.: 413,161

[52] U.S. Cl. .............. 403/172; 403/295; 403/298
[51] Int. Cl. ............................................. F16b 7/00
[58] Field of Search .......... 403/295, 298, 171, 176, 403/205, 172, 170, 175, 174, 173, 178, 177; 52/758 H, 753 E

[56] References Cited
UNITED STATES PATENTS

| | | | |
|---|---|---|---|
| 2,926,941 | 3/1960 | Thompson | 403/173 |
| 3,000,656 | 9/1961 | Hollaender | 403/298 |
| 3,089,716 | 5/1963 | Berkowitz | 52/753 E |
| 3,211,481 | 10/1965 | Cadovius | 403/171 |
| 3,711,133 | 1/1973 | Werner | 403/292 X |

FOREIGN PATENTS OR APPLICATIONS 766,815  1/1957  United Kingdom ................ 403/292

Primary Examiner—Andrew V. Kundrat

[57] ABSTRACT

The invention provides a molded plastic furniture article joint component, e.g. of ABS, shaped as a tee with e.g. with a 90 degree angle between the arms thereof, wherein the bores of the two arms and single leg are mutually open to one another at the common juncture of the arms and leg, wherein the outer end portions of the arms are serrated and wherein the outer end portion of the leg is provided with a plurality of longitudinal serrations so sized and tapered that there is no need for a separate operation to form a trough between the smooth and serrated portions of the leg. Usually, the plastic joint component is plated to exteriorly appear as bright metal, such as nickel-chrome, chrome or brass. The components are used with like ones to assemble e.g. tables, etageres, and the like.

1 Claim, 5 Drawing Figures

MOLDED JOINT COMPONENT FOR TUBULAR FRAME FURNITURE

BACKGROUND OF THE INVENTION

Several designs and manufacturers have suggested or provided occasional tables, book cases and the like framed with round- or square-sectional metal tubes. In some instances, the tubular framing elements are joined at the corners by mitring and electronic welding. If reinforcing elements are provided inside the tubular elements bridging such joints, they are not visible from outside the finished furniture articles. In some instances successful joints can be formed by mitring the tubular elements and force-fitting a joint bridging reinforcing members in the ends of the elements. In such instances, also, the presence of the reinforcing member is deduced rather than observed. The following prior publications illustrate tubular furniture with butted, mitred tubular elements which may or may not enclose joint-bridging reinforcing members:

Advertisement of International Contract Furniture, *Interiors*, April 1966, p. 190.

Advertisement of Metropolitan Furniture Corporation, *Interiors*, May 1966, p. 91.

Bell, David E., "Unpretentious Luxury for Clients In Short Hills, New Jersey", *Interiors*, April 1966, photograph, upper right, p. 122.

Magna Furniture Corporation, *Interiors*, April 1966, photograph No. 13, p. 150.

Virtue of California, *Better Homes and Gardens*, January 1971, photograph B, p. 36.

"Eye-Catching Amid Neutrals — New Artworks, Old Orientalia", *House Beautiful*, February 1972, unpaginated.

Advertisement of Casual Furniture Mart, Inc., *Interiors*, September 1968,, p. 79.

"After", *Better Homes and Gardens*, February 1972, p. 78.

Kramer, U.S. Pat. No. D. 220,704, granted May 11, 1971.

Molla, U.S. Pat. No. D. 168,167, granted Nov. 11, 1952.

Grundy, U.S. Pat. No. D. 166,666, granted May 6, 1952.

Other designers and manufacturers have suggested or provided similar furniture wherein the joints include folded tel-and/or ell-shaped joint elements which are fastened in the bores of the adjacent ends of the tubes and remain visible in the completed furniture articles. The following prior publications illustrate tubular furniture with apparent joint-bridging reinforcing members:

Moeckl, U.S. Pat. No. D. 212,765, issued Nov. 19, 1968.

Creative Interiors, Ltd., Etageres E-21, E-22.

John Mascheroni Furniture Company, Inc., Table 2, 12, permanent collection, Museum of Modern Art,, New York.

Tyndale, Inc., Lusterous Super Chrome etagere and table.

Cy Mann Designs Ltd., "Designers Collection 71", No. 333 hanging console, No. 337 bunch table, No. 335 game table.

Back, U.S. Pat. No. 3,021,159, issued Feb. 13, 1962.

Reilly, U.S. Pat. No. 3,532,369, issued Oct. 6, 1970.

Gretz,, U.S. Pat. No. 3,386,590, issued June 4, 1968.

Most if not all of the exposed corner joints of the prior art are made of bright-plated metal base and the furniture articles in which they are incorporated have tended to be expensive, due to the amount of hand work required in the fitting, clean-up and plating.

Many parts on new automobiles, including grilles and control knobs are now made of acrylonitrile-butadiene-styrene plastic moldings, plated with bright metal, or painted. Molded parts, such as football helmets, made of the same plastic draw on its reputation for strength and impact resistance.

Accordingly, the present inventor developed a design of angled tee corner joint connector made of bright metal-plated ABS plastic material which appears under uncritical observation to match that sought to be protected hereby. Each of the original connectors has two arms and a leg which are smoothsurfaced near their mutual juncture. The arms are provided near their free ends with a plurality of axially spaced, circumferentially proceeding serrations and the leg is provided near its lower end with a plurality of angularly spaced, axially proceeding serrations. A small horizontal web was provided extending between the arms on the inside of the ell at their juncture. A circumferentially extending radially outwardly opening trough was provided on each arm and leg between the smooth and serrated portions thereof. The troughs of the arms were molded in place, but that on the leg was crimped in place. The connectors were used in groups of four to construct tables by forcing the arms into the bores of adjacent ends of four bright metal plated tubes to create the rectangular frame of a tabletop. The legs of the four connectors were forced into the bores of the upper ends of four bright metal plated tubes to create the table's legs. The lower ends of the legs were provided with conventional floor glides. the four horizontal webs between the two arms of each connector provided support for a rectangular piece of glass to serve as the table top. The troughs which were provided as described above had the following function: as the serrated parts of the arms and legs were forced into the bores of the ends of the bright metal plated tubes, small amounts of the plating and substrate plastic material of the corner joints tended to be shaved off the crests of the serrations due to the relative hardness and sharpness of the ends of the metal tubes compared to the material of the serrations. Were the troughs not provided, the shavings would build up in some instances and prevent the last thirty-second of an inch or so of the intended incursion of the joint arm or leg into the bore of the particular tube. The shavings would also on occasion have protruded from the overlap of the arm or leg and the tube end. As the intent was to have the seam between the tubes and joint components be as smooth, finished and unobtrusive as possible, the troughs were considered vital elements of the joint components.

It was for mold construction reasons that the trough on the longitudinally serrated leg ends was crimped in rather than being molded in place. In addition, as part of the original design, a 0.06 inch thick web was provided between the bore of the leg and the juncture of the bores of the arms of each joint component, for expediency in coring the mold. However, this web was a nuisance during the plating operation, because, depending on how the parts were racked for plating, some plating solution remained in the interior of the joint components. Tye parts had to be individually tilted to dump the solution back into the bath if the solution was not to be lost, or the webs had to be manually broken out prior to the plating operation.

Dissatisfaction with the need to carry on a separate step to provide the troughs on the legs and to break out the interior webs or to retrieve trapped plating solution led to the redesign of the joint components to eliminate the separate trough-forming operation and to eliminate the interior webs.

SUMMARY OF THE PRESENT INVENTION

This invention provides a molded plastic furniture article joint component, e.g. of ABS, shaped as a tee with e.g. with a 90° angle between the arms thereof, wherein the bores of the two arms and single leg are mutually open to one another at the common juncture of the arms and leg, wherein the outer end portions of the arms are serrated and wherein the outer end portion of the leg is provided with a plurality of longitudinal serrations so sized and tapered that there is no need for a separate operation to form a trough between the smooth and serrated portions of the leg. Usually, the plastic joint component is plated to exteriorly appear as bright metal, such as nickel-chrome, chrome or brass. The components are used with like ones to assemble e.g. tables, etageres, and the like.

The principles of the invention will be further hereinafter discussed with reference to the drawing wherein a preferred embodiment is shown. The specifics illustrated in the drawing are intended to exemplify, rather than limit, aspects of the invention as defined in the claims.

IN THE DRAWING

DETAILED DESCRIPTION OF A PRESENTLY PREFERRED EMBODIMENT OF THE INVENTION

Figure 1:
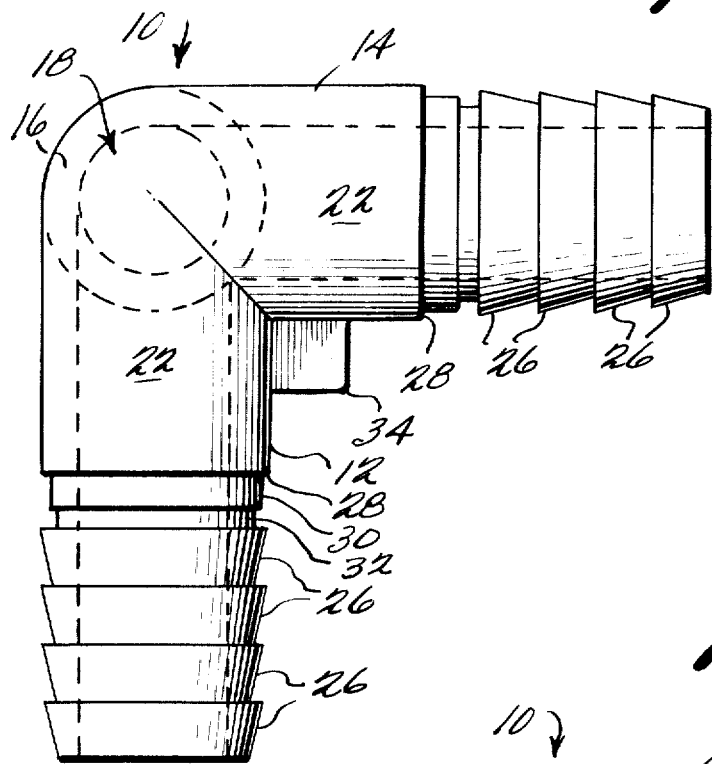
FIG. 1 is a top plan view of the corner joint component.
Figure 2:
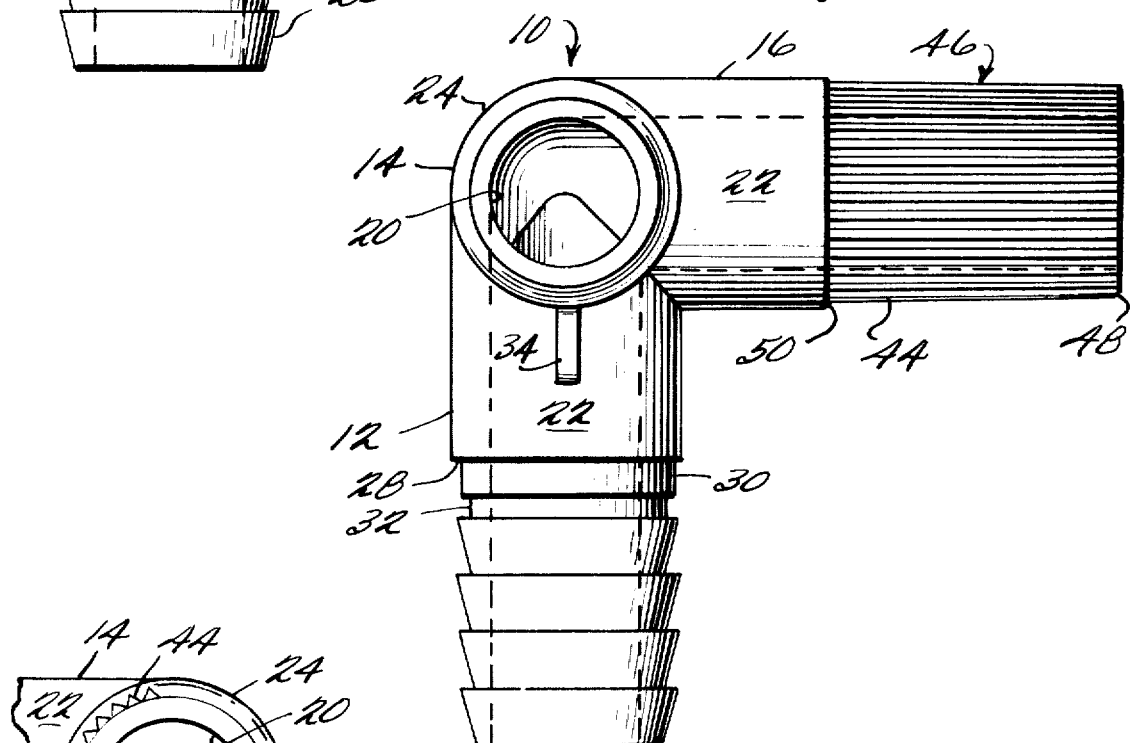
FIG. 2 is a side elevation view of the corner joint component.
Figure 3:
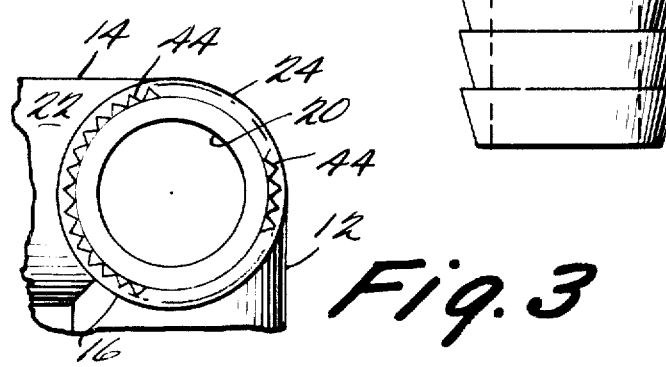
FIG. 3 is a bottom plan view of the end of the leg of the corner joint component.

In the description which follows, there are many references to dimensions given to complete a disclosure of the best mode of the invention. Except for those relating to the size of the fluted leg of the joint component *relative* to the size and shape of the furniture tubular leg, the dimensions are illustrative.

The joint component 10 is constituted by an integral injection molding of e.g. ABS plastic material. The joint component 10 includes two tubular arms 12, 14 which meet one another at a right angle in a horizontal plane and a tubular leg 16 which depends from their juncture 18. The part 10 is characterized by the unobstructed communication of the three branches of the bore 20 which proceeds longitudinally through the arms 12, 14 and leg 16 to their juncture. Each of the arms 12, 14 and leg 16 is exteriorly circularly cylinderical and smooth in the respective portions 22 thereof extending from the juncture 18, excepting that the outside corner 24 is rounded to constitute approximately one-sixth of a sphere.

The outer end portion of each arm 12, 14 is provided with a plurality of axially spaced, circumferentially extending serrations 26. Near the juncture between the serrations 26 and the smooth portions 22, the exterior of the arms is abruptly reduced in diameter to provide a circumferentially extending, axially outwardly facing, radial shoulder 28, an axially short cylinderical band 30 extending from the base of the shoulder 28 and a circumferentially extending trough 32.

A small horizontal flange 34 is provided on the inside of the ell between the arms 12, 14, centered on the horizontal plane which includes their longitudinal axes, for cooperating with like flanges on others of the joint components assembled with tubes to make a furniture article, for supporting a table top or shelf e.g. of glass.

Figure 5:
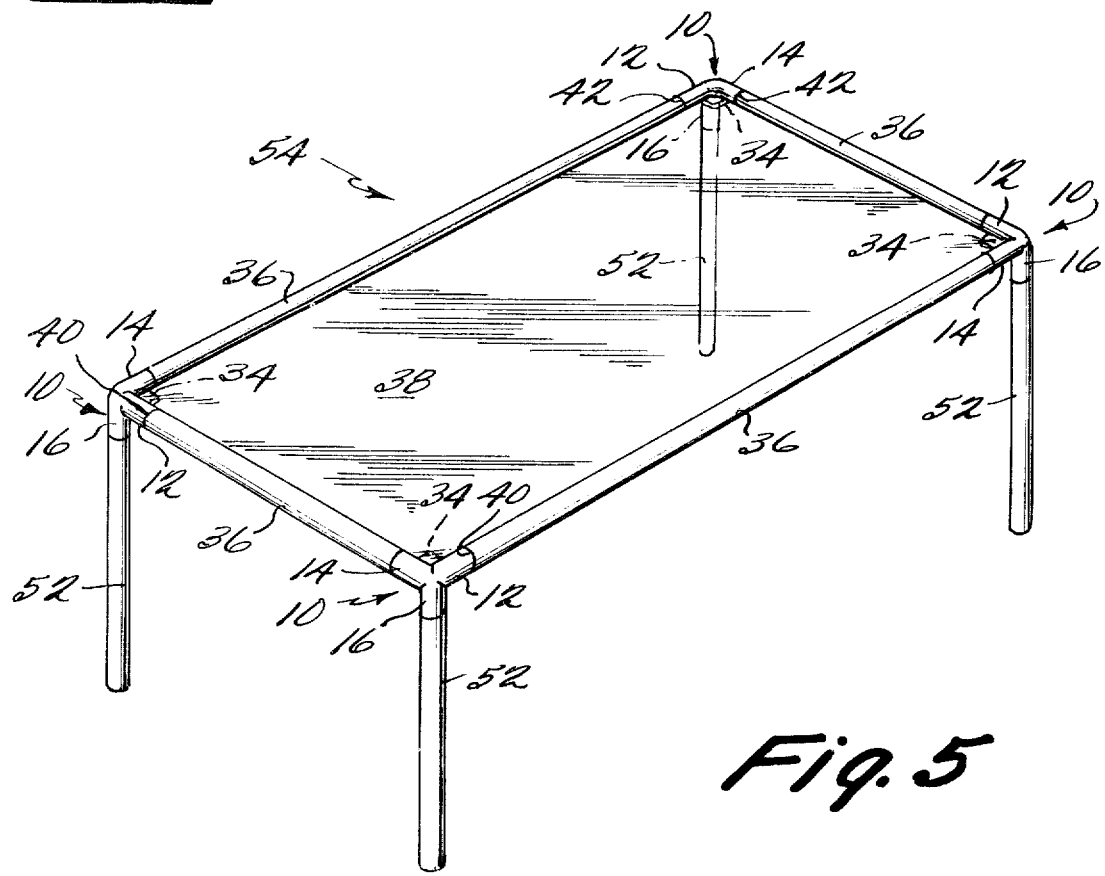
FIG. 5 is a small scale perspective view of a table assembled from eight lengths of tubing and four joint components provided in accordance with the present invention.

Normally, the serrated portions of the arms 12, 14 are forced into the longitudinal bases of the ends of the tubes 36 (FIG. 5) which will frame the shelf or top 38 until the ends 40 of the tubes 38 abut the shoulders 28. The outer diameters of the tubes 38 and the smooth portions of the arms 12, 14 adjacent the shoulders 28 are substantially alike, so the seams at the joints are seen as fine lines 42 between flush surfaces. (This refers, of course, to the size of the plastic part 10 after it has been slightly increased by being plated, prior to such assembly.) The size and shape of the serrations equips the joint component 10 to stay secured with the tubes 36 even when moderate weight is placed on the shelf or top 38.

The outer end portion of the leg 16 is provided with a plurality of angularly spaced, longitudinally extending serrations 44 which collectively present an exterior appearance resembling the sidewall of a fluted cupcake paper. The analogy holds true to the extent that the serrated portion 46 is slightly tapered, being of slightly smaller exterior diameter at the free end 48 than where the serrations 44 adjoin the smooth portion 22 of the leg at the radial, circumferentially extending, axially facing shoulder 50.

Figure 4:
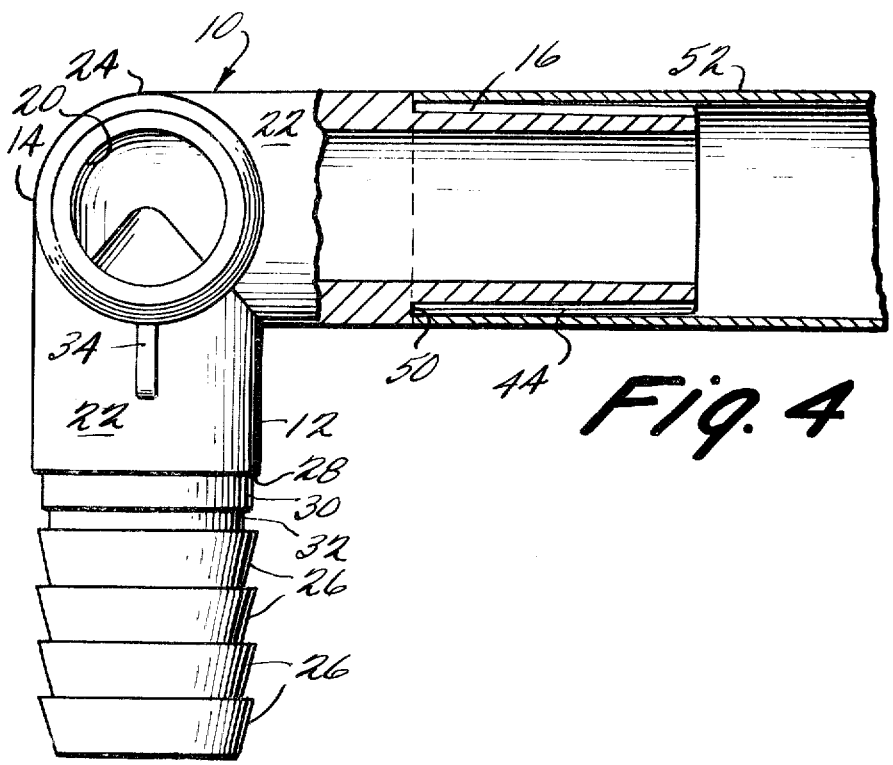
FIG. 4 is a fragmentary longitudinal sectional view showing a typical joint formed by the leg of the component with a metallic tubular table leg.

Unlike the arms 12, 14, the legs 16 when the serrated portions are forced into vertical tubes 52 to constitute e.g. a table 54 (FIGS. 4 and 5), are primarily axially compressively loaded. Accordingly, the serrations of the legs 16 do not need to provide as great an interference with the internal surface 5 of the bores of the tubes 52. Of primary importance is merely that the legs 52 not fall off when the table 54 is lifted from the floor.

The completed molded parts 10 have flashing, etc. removed as is conventional and are then plated in a conventional manner, i.e. in the same way that automobile grillework and television receiver control knobs made of the same material are provided with metal plating. The preferred platings give the parts 10 the appearance of polished nickel-chrome, chrome, brass or the like. Although ABS is the preferred molding material for the parts 10, other similarly tough plastics which may be plated, i.e. the sorts used for automobile grillework, may be used.

In the following table, which refers to the lettering on the figures of the drawing, dimensions are given in order to more clearly convey some of the details of the preferred embodiment of the invention.

TABLE

| Location on Part | Dimension (Inches) |
|---|---|
| O. D. 12, 14, 16 | 1.500 |
| O. D. 26 | 1.418 |
| O. D. 32 | 1.312 |
| O. D. 30 | 1.402 |
| Radius 28, 50 | .010 |
| O. D. 48 | 1.390 |
| O. D. 46 | 1.405 |
| O. D. 48 | 1.420 |
| Serrations Depth | .062 |
| Degree At 44 | 45° |
| I. D. 20 | 1.000 to .937 |
| Inside Radius At 18 | .468 |
| Outside Radius At 24 | .760 |
| Thickness At 34 | 1.87 |
| Tube O. D. at 52 | 1.496 to 1.504 |

O. D. - Outside Dimension
I. D. - Inside Dimension

Summarizing, redesigning of the joint component consisted of two major changes: (1) the elimination of an internal diaphram; and (2) resizing-taper change, on "knife edge" leg. These changes,, while not making any readily apparent modification to the part's appearance, do affect the connector as follows:

1. Elimination of internal diaphram
   a. Allows the part to be platable (racked for electroplating) in any direction allowing more efficient rack design, greater plating tank loads, less tank solution "carry over over" contamination, and higher finished part yield.
   b. Allows use of less ABS material and thus less cost.
   c. Provides for less cooling produced deformation due to the elimination of this internal mass.
2. Resizing of knife edge leg
   a. Elimination the operation which removed the knife edges at the junction with the smooth (exposed) part of leg.
   b. Elimination of the use of a lubricant on this leg to aid the "sliding on" of the part into the tube.

It should now be apparent that the molded joint component for tubular frame furniture as described hereinabove possesses each of the attributes set forth in the specification under the heading "Summary of the Invention" hereinbefore. Because the molded joint component for tubular frame furniture of the invention can be modified to some extent without departing from the principles of the invention as they have been outlined and explained in this specification, the present invention should be understood as encompassing all such modifications as are within the spirit and scope of the following claims.

I claim:

1. A molded joint component for tubular frame furniture such as for joining two tubular metal stretchers which approach one another at an angle in a horizontal plane with a tubular metal leg, said joint component comprising:

an integral tubular molding of acrylonitrile-butadiene-styrene plastic material bearing an exterior bright metallic plating throughout and having the shape of a folded tee wherein two arms of the tee join one another in a horizontal plane and a leg depends from their juncture, the bores of the arms and leg intersecting and intercommunicating at said juncture;

each arm and said leg having a smooth portion at said juncture and leading toward the three respective free ends;

each arm and said leg having a serrated portion axially outwardly of the smooth portion thereof, near the three respective free ends;

means defining an axially outwardly facing, circumferentially extending radial shoulder on each arm and said leg bordering the axially outer extent of the three respective smooth portions;

the serrations and shoulders being disposed to permit the respective arms and leg to be forced into the bores of tubular frame elements to be joined to the extent where the elements abut the respective sholders and are interiorly gripped by the respective serrations;

the serrations on said leg being constituted by a plurality of angularly spaced, longitudinally extending flutes which collectively extend from the free end of the leg to the shoulder and gradually increase in outer diameter from the free end to the shoulder;

the collective outer diameter of the flutes at the shoulder on said leg being smaller than the outer diameter of said shoulder and the arms meeting one another at a right angle and the integral tubular molding further including a horizontal flange extending between the arms at their juncture, whereby a shelf may be supported upon incorporation of the joint component with like others and tubular metal stretchers and legs to constitute tubular frame furniture.

* * * * *